United States Patent
Hyeon et al.

(10) Patent No.: US 12,448,691 B2
(45) Date of Patent: Oct. 21, 2025

(54) CATALYST FOR PRODUCING HYDROGEN PEROXIDE, AND PREPARATION METHOD THEREFOR

(71) Applicants: SEOUL NATIONAL UNIVERSITY R&DB FOUNDATION, Seoul (KR); INSTITUTE FOR BASIC SCIENCE, Daejeon (KR)

(72) Inventors: Taeghwan Hyeon, Seoul (KR); Yung-Eun Sung, Seoul (KR); Heejong Shin, Seoul (KR); Byoung-Hoon Lee, Seoul (KR); Euiyeon Jung, Seoul (KR)

(73) Assignees: SEOUL NATIONAL UNIVERSITY R&DB FOUNDATION, Seoul (KR); INSTITUTE FOR BASIC SCIENCE, Daejeon (KR)

( * ) Notice: Subject to any disclaimer, the term of this patent is extended or adjusted under 35 U.S.C. 154(b) by 801 days.

(21) Appl. No.: 17/629,234

(22) PCT Filed: Jul. 21, 2020

(86) PCT No.: PCT/KR2020/009589
§ 371 (c)(1),
(2) Date: Jan. 21, 2022

(87) PCT Pub. No.: WO2021/015531
PCT Pub. Date: Jan. 28, 2021

(65) Prior Publication Data
US 2022/0267912 A1     Aug. 25, 2022

(30) Foreign Application Priority Data

Jul. 22, 2019  (KR) .......................... 10-2019-0088615

(51) Int. Cl.
| | |
|---|---|
| *B01J 23/75* | (2006.01) |
| *B01J 27/20* | (2006.01) |
| *B01J 37/02* | (2006.01) |
| *C25B 1/30* | (2006.01) |
| *C25B 11/065* | (2021.01) |
| *C25B 11/075* | (2021.01) |

(52) U.S. Cl.
CPC .................. *C25B 1/30* (2013.01); *B01J 23/75* (2013.01); *B01J 27/20* (2013.01); *B01J 37/0201* (2013.01); *C25B 11/065* (2021.01); *C25B 11/075* (2021.01)

(58) Field of Classification Search
CPC ........ B01J 23/75; B01J 27/20; B01J 37/0201; C25B 1/30; C25B 11/065; C25B 11/075
USPC ....................................................... 502/325
See application file for complete search history.

(56) References Cited

U.S. PATENT DOCUMENTS

| | | | | |
|---|---|---|---|---|
| 8,198,479 | B2* | 6/2012 | Arhancet | ................. B01J 27/24 562/575 |
| 8,962,513 | B2* | 2/2015 | Liu | .......................... B01J 27/24 502/200 |
| 2017/0342578 | A1 | 11/2017 | Tour et al. | |

FOREIGN PATENT DOCUMENTS

| | | |
|---|---|---|
| KR | 20140093701 A | 7/2014 |
| KR | 20190057245 A | 5/2019 |

(Continued)

OTHER PUBLICATIONS

Yuanjun Chen et al., "Single-Atom Catalysts: Synthetic Strategies and Electrochemical Applications," Cell Press reviews, Joule 2, Jul. 18, 2018, pp. 1242-1264.

(Continued)

*Primary Examiner* — Cam N. Nguyen

(57) ABSTRACT

A catalyst for producing hydrogen peroxide and a preparation method therefor are provided. The catalyst for producing hydrogen peroxide according to the embodiments of the present invention comprises a carbon-based support and a catalyst moiety that is bonded to the carbon-based support and comprises an $M_1$-N bonding structure ($M_1$ represents a transition metal atom). The method for preparing a catalyst for producing hydrogen peroxide according to the embodiments of the present invention comprises preparing a car- (Continued)

bon-based support, providing a transition metal atom ($M_1$) to the carbon-based support, and doping nitrogen into the carbon-based support.

7 Claims, 10 Drawing Sheets

(56) References Cited

FOREIGN PATENT DOCUMENTS

| WO | WO-2009061785 A2 * | 5/2009 | ............... C25B 1/30 |
|---|---|---|---|
| WO | 2013068243 A | 5/2013 | |
| WO | 2018/195045 A1 | 10/2018 | |

OTHER PUBLICATIONS

Jiantao Li et al., "Boosting oxygen reduction activity with low-temperature derived high-loading atomic cobalt on nitrogen-doped graphene for efficient Zn-air batteries," Chemical Communications, 2019.

Bo-Quan Li et al., "Electrosynthesis of Hydrogen Peroxide Synergistically Catalyzed by Atomic Co-Nx-C Sites and Oxygen Functional Groups in Noble-Metal-Free Electrocatalysts," Advanced Materials, Apr. 10, 2019, pp. 1-44.

Andrea Zitolo et al., "Identification of catalytic sites in cobalt-nitrogencarbon materials for the oxygen reduction reaction," Nature Communications, Oct. 16, 2017, pp. 1-11.

Zhiyi Lu et al., "High-efficiency oxygen reduction to hydrogen peroxide catalysed by oxidized carbon materials," Nature Catalysis, Jan. 15, 2018, pp. 156-162.

* cited by examiner

CATALYST FOR PRODUCING HYDROGEN PEROXIDE, AND PREPARATION METHOD THEREFOR

TECHNICAL FIELD

The present invention relates to a catalyst for producing hydrogen peroxide ($H_2O_2$) and a preparation method therefor.

BACKGROUND ART

Hydrogen peroxide ($H_2O_2$) is one of the important chemicals that plays an important role in the chemical and medical industries. Industrial production of $H_2O_2$ relies heavily on the anthraquinone process, which is an energy-intensive process involving the hydrogenation of 2-alkyl-anthraquinones using expensive palladium catalysts.

DISCLOSURE

Technical Problem

In order to solve the above mentioned problems, the present invention provides a catalyst for producing hydrogen peroxide having good performance.

The present invention provides a method for preparing the catalyst for producing hydrogen peroxide.

The other objects of the present invention will be clearly understood by reference to the following detailed description and the accompanying drawings.

Technical Solution

A catalyst for producing hydrogen peroxide according to the embodiments of the present invention comprises a carbon-based support and a catalyst moiety that is bonded to the carbon-based support and comprises an $M_1$-N bonding structure ($M_1$ represents a transition metal atom).

A method for preparing a catalyst for producing hydrogen peroxide according to the embodiments of the present invention comprises preparing a carbon-based support, providing a transition metal atom ($M_1$) to the carbon-based support, and doping nitrogen into the carbon-based support.

Advantageous Effects

A catalyst for producing hydrogen peroxide according to the embodiments of the present invention may have good performance. For example, the catalyst for producing hydrogen peroxide may have high kinetic current density and mass activity with good stability for a long time. In addition, the catalyst for producing hydrogen peroxide can be prepared by a simple method and the manufacturing cost is low.

BEST MODE

Figure 1:
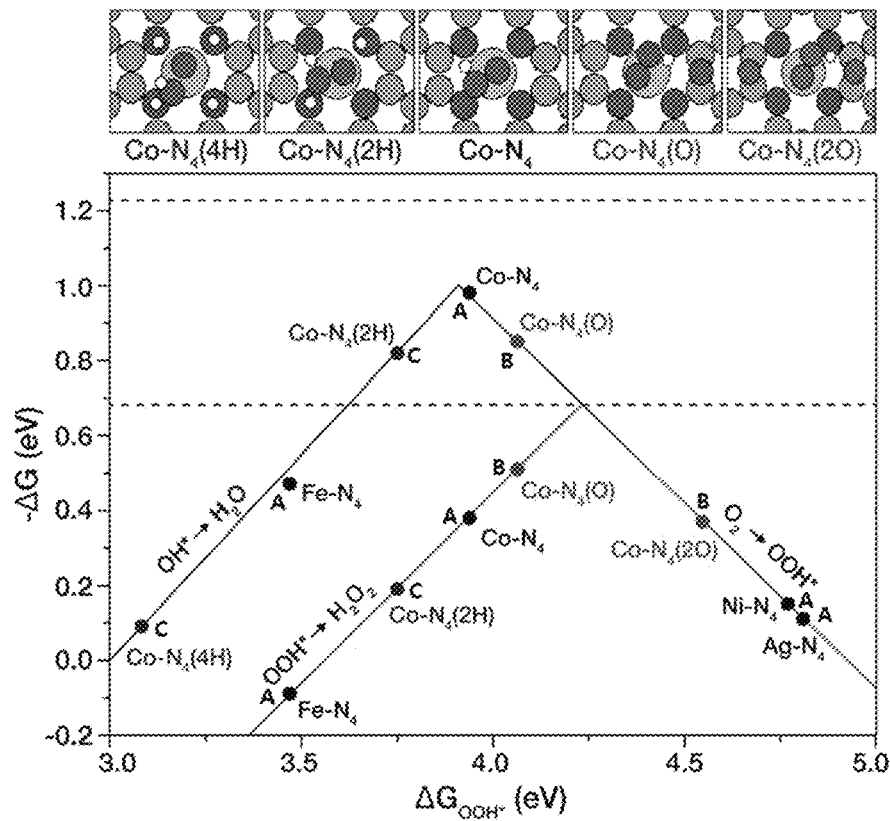
FIG. 1 shows the catalytic activity for the production of $H_2O$ and $H_2O_2$ through the oxygen reduction reaction.

Hereinafter, a detailed description will be given of the present invention with reference to the following embodiments. The purposes, features, and advantages of the present invention will be easily understood through the following embodiments. The present invention is not limited to such embodiments, but may be modified in other forms. The embodiments to be described below are nothing but the ones provided to bring the disclosure of the present invention to perfection and assist those skilled in the art to completely understand the present invention. Therefore, the following embodiments are not to be construed as limiting the present invention.

The terminology used herein is for the purpose of describing particular embodiments only and is not intended to limit the invention. It is to be understood that the singular forms "a," "an," and "the" include plural references unless the context clearly dictates otherwise. It will be further understood that the terms "comprises" or "has," when used in this specification, specify the presence of stated features, integers, steps, operations, elements, and/or components, but do not preclude the presence or addition of one or more other features, integers, steps, operations, elements, components, and/or groups thereof.

A catalyst for producing hydrogen peroxide according to the embodiments of the present invention comprises a carbon-based support and a catalyst moiety that is bonded to the carbon-based support and comprises an $M_1$-N bonding structure ($M_1$ represents a transition metal atom).

The catalyst moiety may comprise an $M_1$-$N_4$ bonding structure. The $M_1$ may function as a metal single atom catalyst. The $M_1$ may comprise cobalt (Co).

The catalyst for producing hydrogen peroxide may further comprise an electron-rich species bonded to the carbon-based support near the catalyst moiety, and the electron-rich species may change the charge state of the $M_1$. The electron-rich species can increase $\Delta G_{OOH*}$ for $H_2O_2$ production. The electron-rich species may comprise oxygen.

The carbon-based support may comprise a C—O—C bonding structure. The carbon-based support may comprise graphene oxide. The carbon-based support may be doped with nitrogen.

A method for preparing a catalyst for producing hydrogen peroxide according to the embodiments of the present invention comprises preparing a carbon-based support, providing a transition metal atom ($M_1$) to the carbon-based support, and doping nitrogen into the carbon-based support.

The doping of nitrogen may comprise forming a catalyst moiety that is bonded to the carbon-based support and comprises an $M_1$-N bonding structure. The catalyst moiety may comprise an $M_1$-$N_4$ bonding structure. The doping of nitrogen may comprise reducing the carbon-based support by treating the carbon-based support with $NH_3$ at 400~600° C.

The transition metal atom may comprise cobalt (Co).

The carbon-based support may comprise an electron-rich species. The electron-rich species may comprise oxygen. The carbon-based support may comprise a C—O—C bonding structure. The carbon-based support may comprise graphene oxide.

Figure 2:
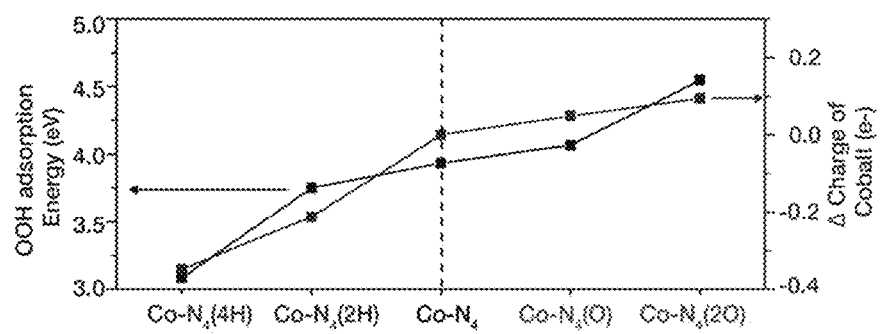
FIG. 2 shows the relative charge state and OOH* adsorption energy of cobalt metal centers in Co—$N_4$/graphene with 4H*/2H*/O*/2O* adsorbed near the cobalt atoms.
Figure 3:
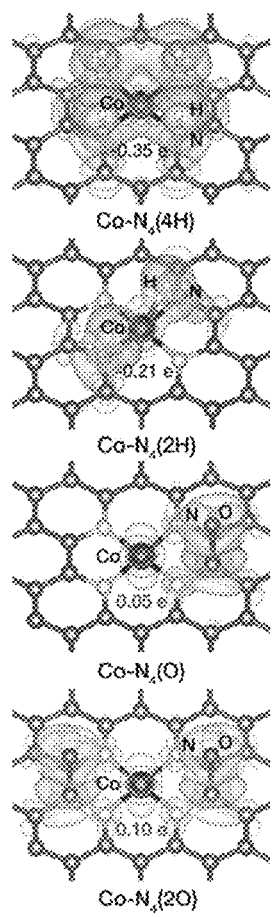
FIG. 3 shows the charge density of Co—$N_4$/graphene with 4H*/2H*/O*/2O* adsorbed near the cobalt atoms.

FIGS. 1 to 3 are views for explaining the structure and activity of a catalyst for producing hydrogen peroxide according to an embodiment of the present invention.

FIG. 1 shows the catalytic activity the production of $H_2O$ and $H_2O_2$ through the oxygen reduction reaction. In FIG. 1, point A represents M-$N_4$/graphene used to draw the catalytic activity graph, and point B represents Co—$N_4$/graphene with electron-rich species (O*/2O*) adsorbed near the cobalt atom, and point C represents Co—$N_4$/graphene with electron-poor species (4H*/2H*) adsorbed near the cobalt atom.

Referring to FIG. 1, the oxygen reduction reaction activity can be expressed as a function of OOH* adsorption energy ($\Delta G_{OOH*}$). $H_2O_2$ production is energetically preferred to $H_2O$ production for Ni, Ag and Pt, whereas it is the other way for Ru, Fe and Co. Since the former metal centers are not as oxophilic as the latter metal centers, the latter metal centers prefer the breaking of the OOH* intermediates to O*, leading to $H_2O$ formation, whereas the former metal centers are prone to OOH* protonation to $H_2O_2$.

According to the calculation results, none of the M-$N_4$/graphene catalysts exists near the peak of the graph for $H_2O_2$ production ($\Delta G_{OOH*}$=4.2 eV). Even the catalysts (Ni, Ag and Pt) preferring $H_2O_2$ production require relatively high overpotentials (>0.5V) for $H_2O_2$ production compared to, for example, the most active Co—$N_4$/graphene that produces $H_2O$. In the above M-$N_4$/graphene, M represents a transition metal atom, M-$N_4$ represents a catalyst moiety bonded to the graphene, and the graphene represents a carbon-based support supporting the catalyst moiety.

It is desirable to modify Co—$N_4$/graphene to maintain most of the catalytic activity of Co—$N_4$/graphene toward $H_2O_2$ production rather than $H_2O$. Therefore, fine-tuning of the interaction between the metal center and the surrounding atomic configuration is required in addition to changing the metal center of the Co—$N_4$ moiety to reach the optimal $\Delta G_{OOH*}$ value for $H_2O_2$ producing.

FIG. 2 shows the relative charge state and OOH* adsorption energy of cobalt metal centers in Co—$N_4$/graphene with 4H*/2H*/O*/2O* adsorbed near the cobalt atoms, and FIG. 3 shows the charge density of Co—$N_4$/graphene with 4H*/2H*/O*/2O* adsorbed near the cobalt atoms.

Referring to FIGS. 2 and 3, $\Delta G_{OOH*}$ can be adjusted by attaching functional groups near the Co—$N_4$ moiety. For example, when an electron-rich species such as O* is adsorbed near the Co—$N_4$ moiety (Co—$N_4$(O)), $\Delta G_{OOH*}$ increases from 3.9 to 4.1 eV getting very close to the optimal value for the $H_2O_2$ production. $\Delta G_{OOH*}$ can be further increased to 4.5 eV when two O* are adsorbed near the Co—$N_4$ moiety (Co—$N_4$ (2O)). Co—$N_4$ (O) represents that one O* is adsorbed near the Co—$N_4$ moiety, and Co—$N_4$ (2O) represents that two O* are adsorbed near the Co—$N_4$ moiety.

Similar results can be drawn for the case where another electron-rich species OH* is adsorbed near the Co—$N_4$ moiety. On the other hand, when an electron-poor species such as $H^+$ is adsorbed near the Co—$N_4$ moiety, $\Delta G_{OOH*}$ decreases from 3.9 to 3.8 eV in Co—$N_4$(2H) and to 3.1 eV in Co—$N_4$(4H). Similar trends are observed when another electron-poor element, carbon, is introduced.

These effects of the functional groups on $\Delta G_{OOH*}$ can be explained by the differences in the charge state of the cobalt atom. In the cases of Co—$N_4$(O) and Co—$N_4$(2O), the charge state of the cobalt atom becomes more positive by $0.05e^-$ and $0.10e^-$, whereas in the cases of Co—$N_4$(2H) and Co—$N_4$(4H), it becomes more negative by $0.21e^-$ and $0.35e^-$, respectively. A strategy for designing a single atom catalyst for $H_2O_2$ production is to slightly increase $\Delta G_{OOH*}$ of Co—$N_4$/graphene by creating electron-rich oxygen species near the Co—$N_4$ moiety such that they can slightly increase the charge state of the cobalt atom. Therefore, it is preferable to use graphene oxide (GO) as the carbon-based support. In addition, epoxides in graphene oxide are thermally more stable than other functional groups such as hydroxyl groups that desorb at low temperature.

FIGS. 4 to 10 are views for explaining the structural characteristics of the catalyst for producing hydrogen peroxide according to an embodiment of the present invention.

Figure 4:
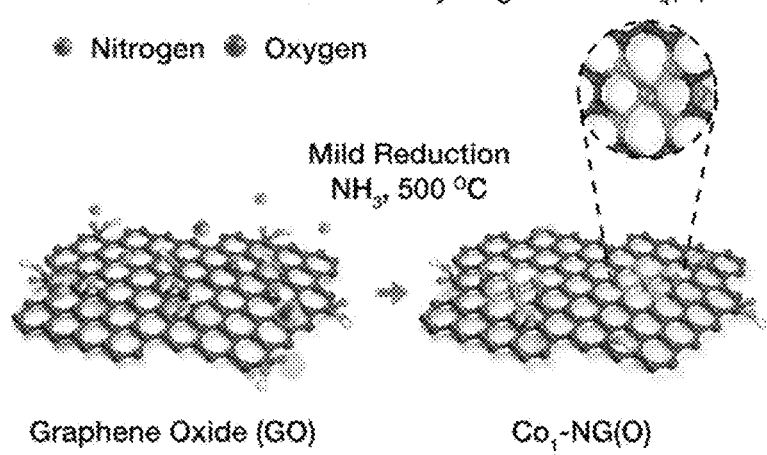
FIG. 4 schematically shows a method for preparing $Co_1$-NG(O).

FIG. 4 schematically shows a method for preparing $Co_1$-NG(O). Referring to FIG. 4, cobalt atoms are adsorbed on the surface of graphene oxide by the impregnation method. Graphene oxide to which cobalt is adsorbed is mildly reduced at 500° C. in $NH_3$/Ar. As such, the $Co_1$-NG(O) represents that the Co—$N_4$(O) moiety is bonded to the nitrogen-doped graphene oxide and heat-treated at 500° C.

Figure 5:
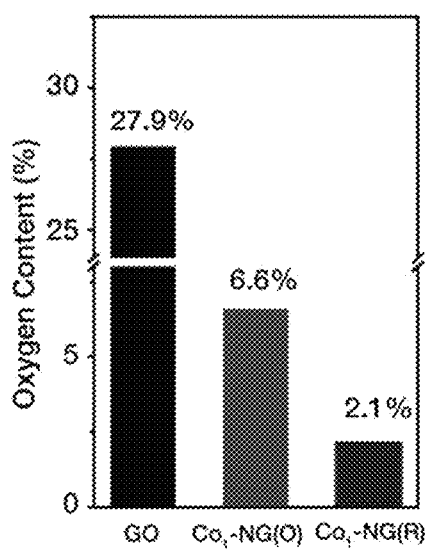
FIG. 5 shows the oxygen content of GO, $Co_1$-NG(O) and $Co_1$-NG(R) prepared at different $NH_3$ reduction temperatures, respectively.

FIG. 5 shows the oxygen content of GO, $Co_1$-NG(O) and $Co_1$-NG(R) prepared at different $NH_3$ reduction temperatures, respectively. The $Co_1$-NG(R) is prepared in the same manner as $Co_1$-NG(O) except that the reaction temperature is 900° C. Referring to FIG. 5, a high oxygen ratio (about 6.6%) can be maintained at a reducing temperature of about 500° C. In addition, a relatively high percentage (5.87%) of nitrogen can be incorporated despite the low annealing temperature.

Figure 6:
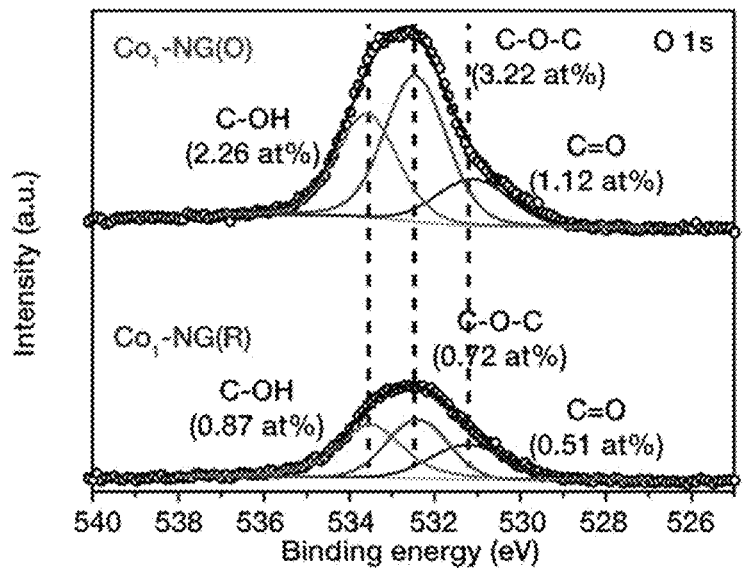
FIG. 6 shows deconvoluted oxygen is spectra of $Co_1$-NG (O) and $Co_1$-NG(R).

FIG. 6 shows deconvoluted oxygen 1s spectra of $Co_1$-NG(O) and $Co_1$-NG(R). Referring to FIG. 6, the C—O—C content of $Co_1$-NG(O) is 3.22%, which is higher than the C—O—C content (0.72%) of $Co_1$-NG(R).

Figure 7:
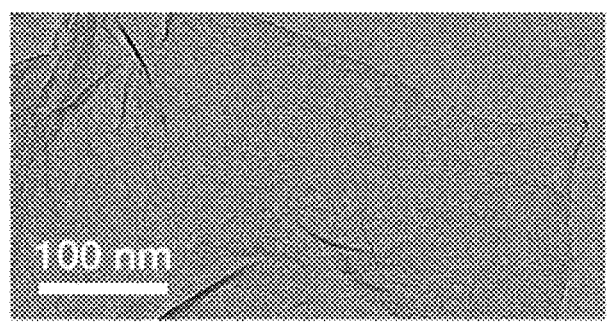
FIG. 7 shows a TEM image of $Co_1$-NG(O).
Figure 8:
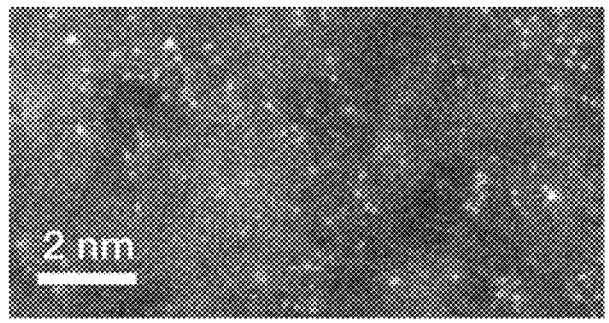
FIG. 8 shows an atomic resolution ADF-STEM image of $Co_1$-NG(O).

FIG. 7 shows a TEM image of $Co_1$-NG(O), and FIG. 8 shows an atomic resolution ADF-STEM image of $Co_1$-NG (O).

During the thermal reduction step, many vacancies are formed, providing anchoring sites for nitrogen atoms and preferential binding sites for metal atoms. The atomic structure of $Co_1$-NG(O) can be imaged by ADF-STEM (annular dark-field scanning transmission electron microscope).

Referring to FIG. 8, individual cobalt atoms are uniformly dispersed throughout the entire graphene matrix. Optimized $Co_1$-NG(O) single atom catalysts have a high concentration of single metal atoms (1.4 wt %)

Other $M_1$-NG(O) (M=Fe, Ni) can be prepared in the same manner and the active surface areas determined by electrochemical measurement are similar.

Figure 9:
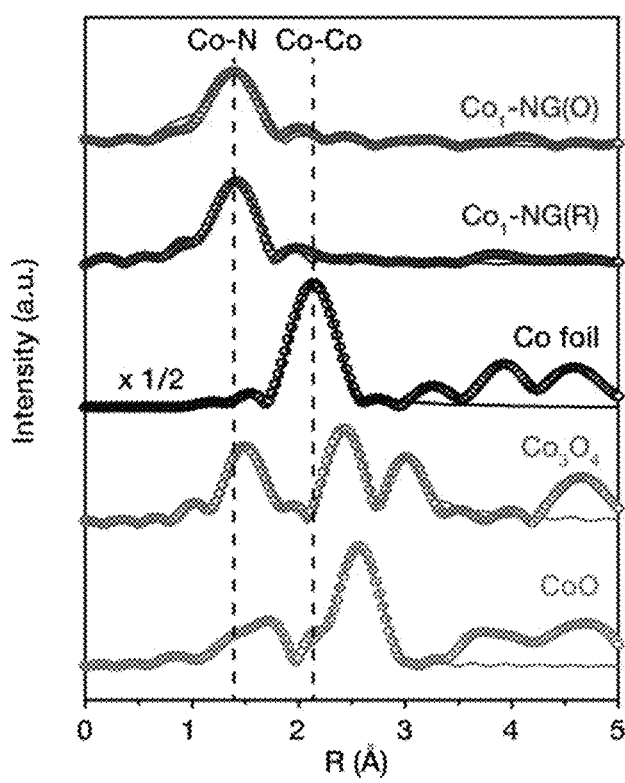
FIG. 9 shows Co K-edge $K^3$-weighted FT-EXAFS spectra in R space for $Co_1$-NG(O), $Co_1$-NG(R), Co foil, $CoO_4$, and CoO.
Figure 10:
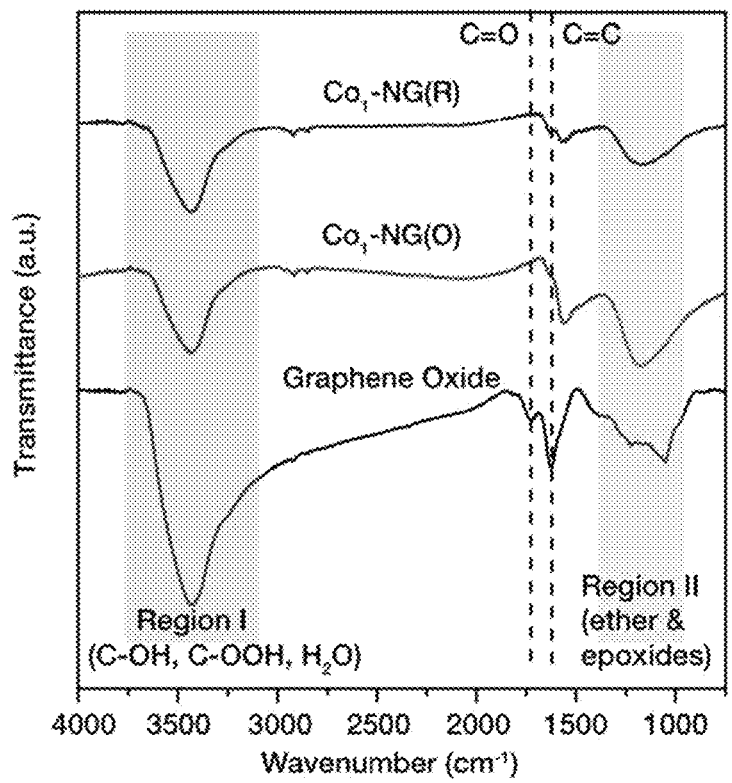
FIG. 10 shows the FTIR spectra of GO, $Co_1$-NG(O) and $Co_1$-NG(R).

FIG. 9 shows Co K-edge $K^3$-weighted FT-EXAFS (Fourier transform extended X-ray absorption fine structure) spectra in R space for $Co_1$-NG(O), $Co_1$-NG(R), Co foil, $Co_3O_4$, and CoO, and FIG. 10 shows the FTIR (Fourier-transform infrared spectroscopy) spectra of GO, $Co_1$-NG(O) and $Co_1$-NG(R). The atomic structure of $Co_1$-NG(O) can be analyzed by X-ray absorption spectroscopy.

Referring to FIG. 9, the FT-EXAFS curves for $Co_1$-NG(O) only showed a main peak (1.4 Å), which can be attributed to Co—N coordination, while the Co—Co peak (2.2 Å) was not detected. The structural parameters of cobalt atoms can be analyzed by performing EXAFS fitting. The coordination number of the fitted parameters is approximately 4. Similarly, the FT-EXAFS curves of other $M_1$-NG(O) single atom catalysts were also fitted and their coordination numbers are also close to 4, demonstrating the presence of metal atoms coordinated by four surrounding N atoms.

XPS (X-ray photoelectron spectroscopy) analysis confirmed that nitrogen was readily incorporated into the graphene matrix at 500° C. and pyridinic N was dominant for $Co_1$-NG(O). $Co_1$-NG(R) was also prepared by ammonia treatment at 900° C., which is a typical carbonization temperature and is much higher than the preparation temperature (500° C.) of $Co_1$-NG(O).

In comparison to $Co_1$-NG(R), the Co 2p spectra of $Co_1$-NG(O) shows a upshift to higher binding energy and the spin-orbit splitting (15.875 eV) of $Co_1$-NG(O) is larger than that (15.504 eV) of $Co_1$-NG(R), indicating the lower charge density state of cobalt atoms. Thus, the $Co_1$-NG(O) has highly oxidized cobalt atom centers, but the $Co_1$-NG(R) is composed of relatively electron-rich cobalt single atoms.

Although not shown in the figure, according to the O K-edge NEXAFS (near edge X-ray absorption fine structure) spectra, the $Co_1$-NG(O) single atom catalyst has more intense and sharp peaks at 535 and 540.4 eV, which can be assigned as the transitions of O 1s core level to $\pi^*$ states and $\sigma^*$ states from C—O bond (e.g. C—O—C epoxides), than $Co_1$-NG(R). This can be confirmed by FTIR spectra of FIG. 10.

Comprehensive analyses by XPS, NEXAFS, and FTIR indicate that cobalt centers become relatively electron-poor by nearby C—O—C atomic structures. These C—O—C groups are thermodynamically stable at the mild reduction temperature of 500° C. which is further supported by the DFT analysis. Therefore, the presence of oxygen species (C—O—C epoxides) near the Co—$N_4$ moiety is desirable for highly active $H_2O_2$ production. After reduction at 900° C., most oxygen species, including C—O—C groups, are desorbed.

FIGS. 11 to 16 are views for explaining the electrochemical oxygen reduction reaction performance of the catalyst for producing hydrogen peroxide according to an embodiment of the present invention.

Figure 11:
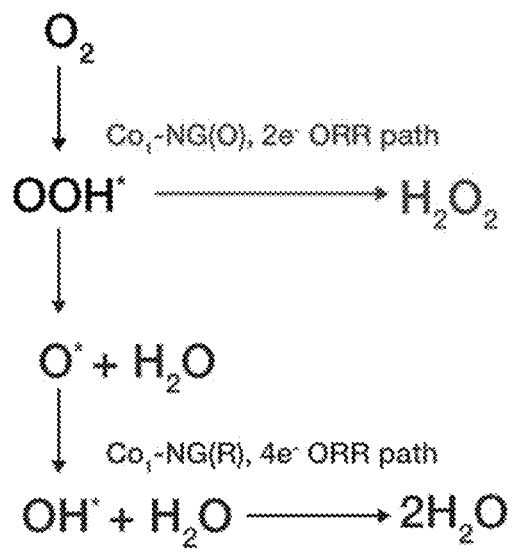
FIG. 11 shows an oxygen reduction reaction pathway to produce $H_2O_2$ or $H_2O$.

FIG. 11 shows an oxygen reduction reaction pathway to produce $H_2O_2$ or $H_2O$. Referring to FIG. 11, the oxygen reduction reaction kinetics can proceed via either $2e^-$ or $4e^-$ pathway and the selectivity is determined by the propensity to break the O—O bond during the oxygen reduction reaction process.

Figure 12:
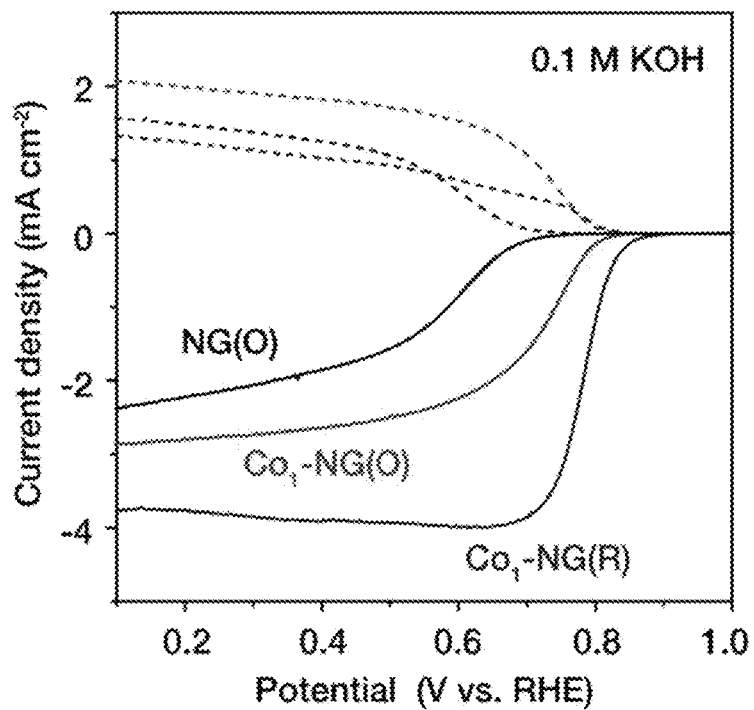
FIG. 12 shows ORR performance (solid line) at 1600 rpm and $H_2O_2$ detection current density (dashed line) at the ring electrode for NG(O), $Co_1$-NG(O) and $Co_1$-NG(R) in 0.1M KOH.

FIG. 12 shows ORR (oxygen reduction reaction) performance (solid line) at 1600 rpm and $H_2O_2$ detection current density (dashed line) at the ring electrode for NG(O), $Co_1$-NG(O) and $Co_1$-NG(R) in 0.1M KOH. Referring to FIG. 12, The amount of $H_2O_2$ formed can be quantified using a rotating ring-disk electrode at 1,600 rpm in oxygen-saturated 0.1M KOH electrolyte. The ring electrode was held at 1.2V to oxidize only $H_2O_2$ formed from the disk electrode, avoiding other oxygen reduction reaction currents at the ring electrode. The $Co_1$-NG(O) catalyst, which has electron-poor cobalt center induced by surrounding oxygen species (e.g. C—O—C epoxides), is able to catalyze the $2e^-$ oxygen reduction reaction showing superior activity for $H_2O_2$ production.

Figure 13:
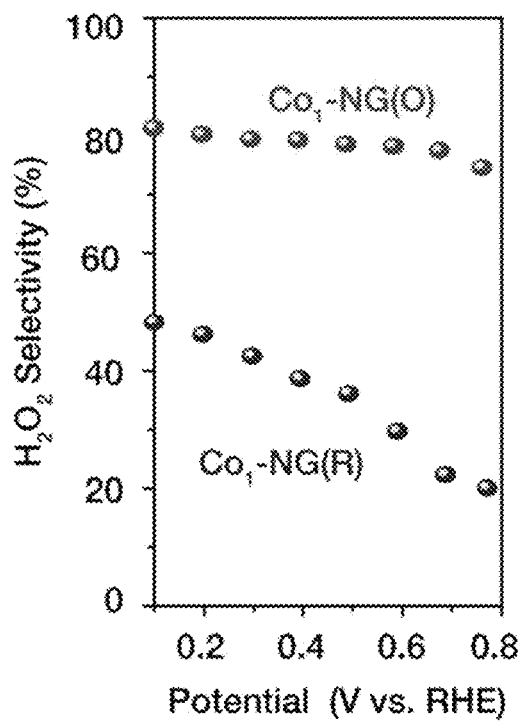
FIG. 13 shows the $H_2O_2$ selectivity calculated as a function of applied potential.

FIG. 13 shows the $H_2O_2$ selectivity calculated as a function of applied potential. Referring to FIG. 13, the electronic structure of Co—$N_4$ site is modified by nearby C—O—C epoxides such that it is difficult to break the O—O bond, ensuring a high selectivity to $H_2O_2$ (about 82%). On the other hand, $Co_1$-NG(R) that is mainly composed of Co—$N_4$ sites predominantly produce water, which matches well with the DFT results (FIG. 1).

Figure 14:
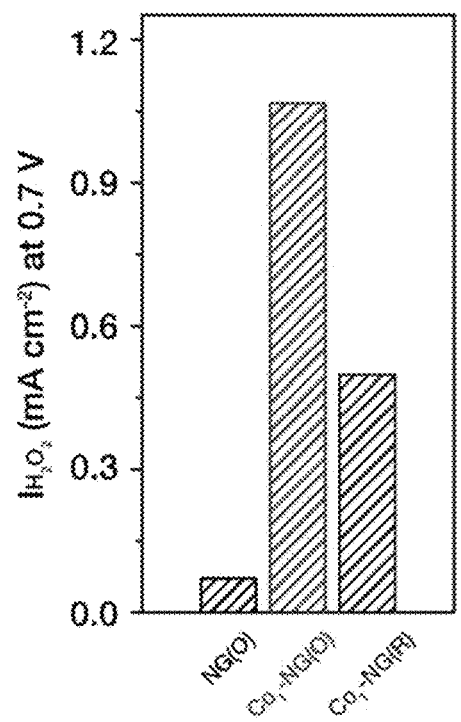
FIG. 14 shows $H_2O_2$ currents at 0.7V for NG(O), $Co_1$-NG(O) and $Co_1$-NG(R).

FIG. 14 shows $H_2O_2$ currents at 0.7V for NG(O), $Co_1$-NG(O) and $Co_1$-NG(R). Referring to FIG. 14, the $Co_1$-NG(O) catalyst delivered much higher $H_2O_2$ production current than the $Co_1$-NG(R) or NG(O), showing its superior activity and selectivity towards $H_2O_2$ production.

Although not shown in the figure, $Co_1$-G(O) which is composed of Co metal centers without nitrogen atom bonding shows hardly any change in the onset-potential and oxygen reduction reaction kinetics with increasing Co amount. This represents that the oxygen reduction reaction performance is associated with the Co—$N_4$ moieties.

Figure 15:
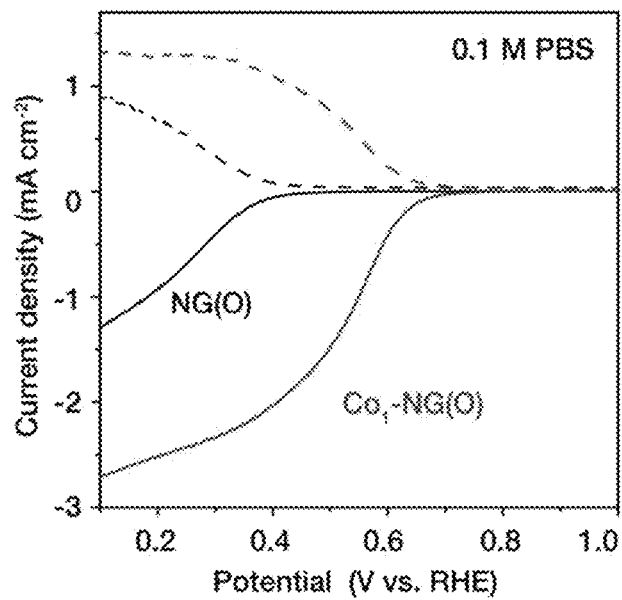
FIG. 15 shows the oxygen reduction reaction polarization curves of NG(O) and $Co_1$-NG(O) in 0.1M PBS (phosphate buffered saline).
Figure 16:
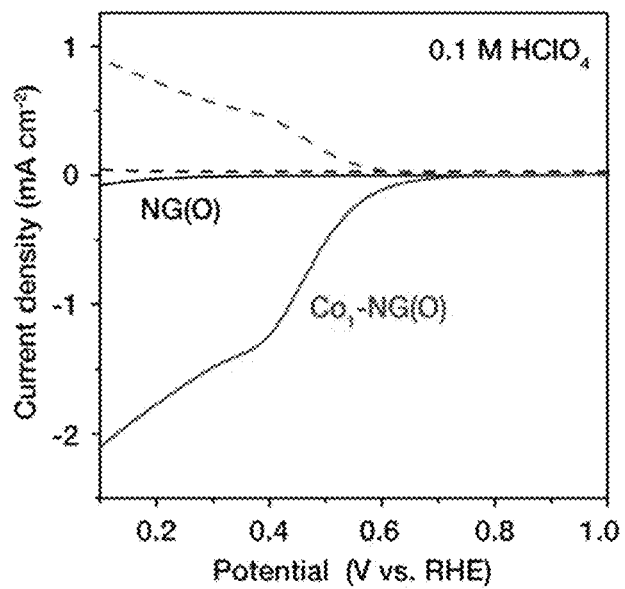
FIG. 16 shows the oxygen reduction reaction polarization curves of NG(O) and $Co_1$-NG(O) in 0.1M $HClO_4$.

FIG. 15 shows the oxygen reduction reaction polarization curves of NG(O) and $Co_1$-NG(O) in 0.1M PBS (phosphate buffered saline), and FIG. 16 shows the oxygen reduction reaction polarization curves of NG(O) and $Co_1$-NG(O) in 0.1M $HClO_4$. Referring to FIGS. 15 and 16, the $Co_1$-NG(O) shows a significant amount of $H_2O_2$ production in acidic (0.1M $HClO_4$), neutral (0.1M phosphate), and basic (0.1M KOH) electrolytes.

Without Co atoms, the NG(O) showed poor activity. However, the electron-poor cobalt metal centers serve as $O_2$ adsorption sites on the graphitic carbon matrix facilitating the adsorption of $O_2$ molecules while preventing further $4e^-$ reduction of oxygen effectively. In addition, the $Co_1$-NG(O) exhibited a significantly higher activity for $H_2O_2$ production than NG(O), $Fe_1$-NG(O) or $Ni_1$-NG(O), with an onset potential of about 0.8V. These indicate that $Co_1$-NG(O) is highly active for $H_2O_2$ production in a wide range of pH levels while effectively preventing the electrochemical dissociation of $H_2O_2$ to $H_2O$.

FIGS. 17 to 20 are views for explaining the $H_2O_2$ production activity and stability of the catalyst for producing hydrogen peroxide according to an embodiment of the present invention.

Figure 17:
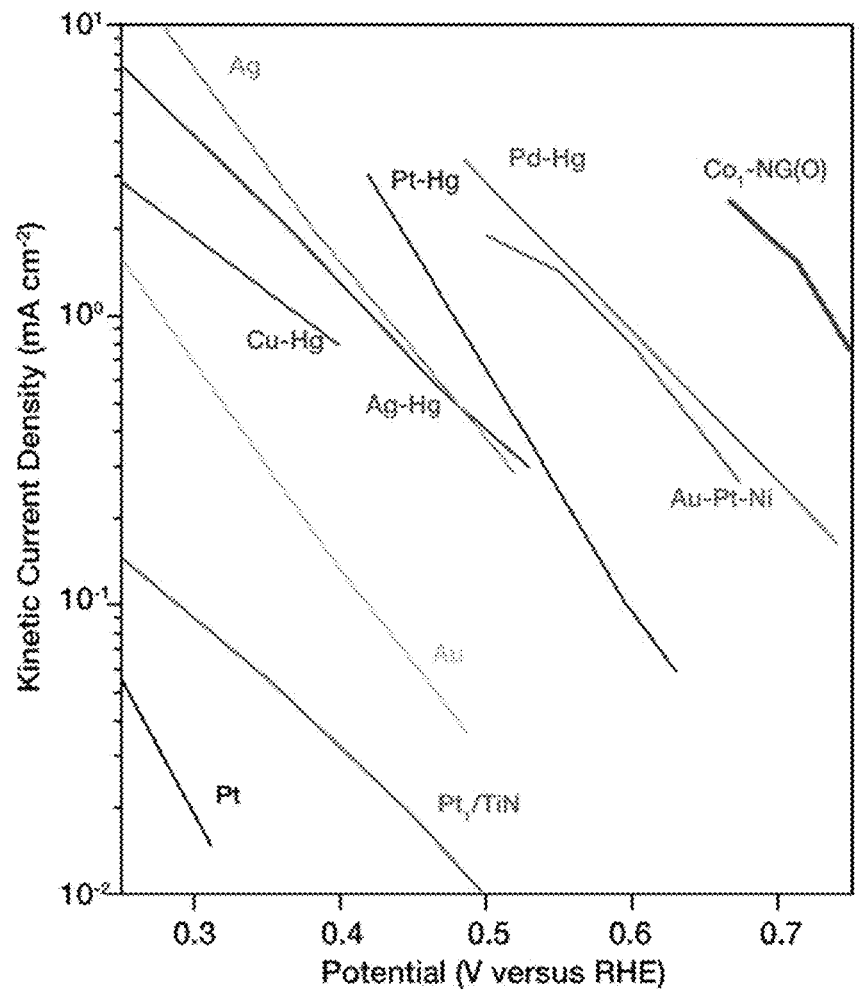
FIG. 17 shows the kinetic current density of $Co_1$-NG(O) compared to other catalysts.

FIG. 17 shows the kinetic current density of $Co_1$-NG(O) compared to other catalysts. For the comparison, the kinetic current density for $H_2O_2$ production has been derived by correcting for mass transport limitations using Koutecky-Levich equation. Referring to FIG. 17, the calculated kinetic current density of $Co_1$-NG(O) for $H_2O_2$ production was 2.84 mA/$cm^2$ at 0.65V, demonstrating its superior $H_2O_2$ production activity that surpasses that of the state-of-the-art electrocatalysts.

Figure 18:
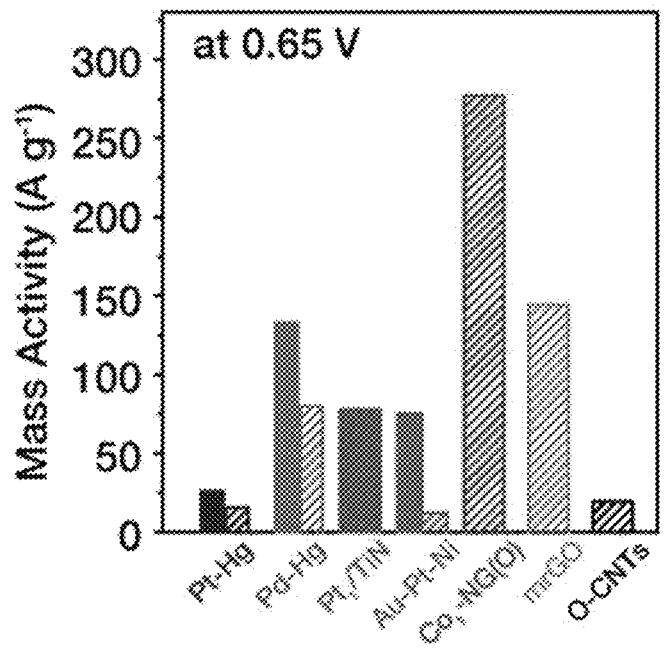
FIGS. 18 and 19 show the mass activity of $Co_1$-NG(O) compared to other catalysts.
Figure 19:
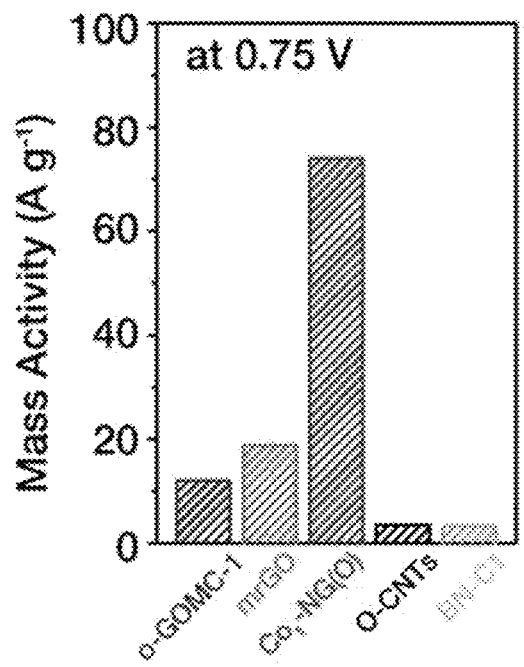

FIGS. 18 and 19 show the mass activity of $Co_1$-NG(O) compared to other catalysts. FIG. 18 shows the mass activity at 0.65V and FIG. 19 shows the mass activity at 0.75V. Referring to FIG. 18, $Co_1$-NG(O) produces $H_2O_2$ with a high mass activity of 277.3 A/g (at 0.65V, with 2,500 rpm). Referring to FIG. 19, a few layered, mildly reduced graphene oxide (F-mrGO) has been known to exhibit the highest mass activity, but $Co_1$-NG(O) exhibits 4 times higher $H_2O_2$ production activity than that of F-mrGO.

To evaluate the amount of $H_2O_2$ generated in real devices, the $Co_1$-NG(O) catalyst was prepared onto carbon paper with a loading of 1 mg/cm$^2$ and tested in a custom-made electrochemical H-type cell. In alkaline electrolyte, the electrochemical $H_2O_2$ production of $Co_1$-NG(O) catalyst was performed. $Co_1$-NG(O) showed a very high $H_2O_2$ productivity of 418(±19) mmol/$g_{cat}$h (at 50 mA), which is more than twice the amount of $H_2O_2$ produced by Au—Pd catalyst.

Figure 20:
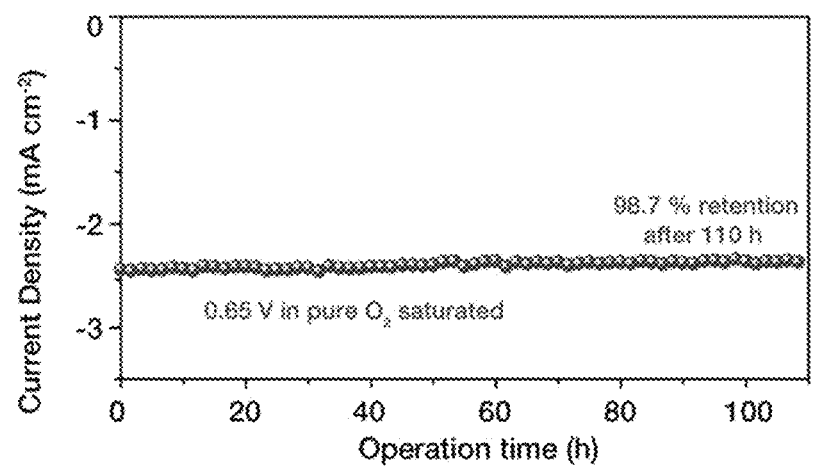
FIG. 20 shows the stability of $Co_1$-NG(O).

FIG. 20 shows the stability of $Co_1$-NG(O). Referring to FIG. 20, 98.7% of the initial current density was maintained after 110 hours. $Co_1$-NG(O) is stable throughout the entire pH level for a long-term production of $H_2O_2$ notably, with the negligible activity loss over 110 hours in alkaline condition. This high stability of $Co_1$-NG(O) represents that the highly active Co—$N_4$(O) moieties are very stable in either alkaline or acidic environment. The stability in a wide pH range and the enhanced $H_2O_2$ production activity can be achieved by electron-poor cobalt metal centers modulated by the surrounding atomic configuration. The high kinetic current density (2.84 mA/cm$^2$ at 0.65V) and mass activity (277.3 Å/g at 0.65V) can be achieved by the fine-tuning of heterogeneous catalytic activity for $H_2O_2$ production over a wide pH range.

Preparation Example of $Co_1$-NG(O)

Graphene oxide was washed with HCl solution and acetone to remove metal impurities (e.g., manganese) that are left as impurity during producing graphene oxide. The washed graphene oxide was then dried in an electric oven at 40° C. overnight. 30 mg of the dried graphene oxide was dispersed in 30 ml of water. $CoCl_2 \cdot 6H_2O$ was dispersed in water at 3 mg/ml of the concentration and 202 µl of the solution was added into the graphene oxide solution. The mixed solution was sonicated for 1 hour and then freeze-dried for 2 days. The prepared metal-adsorbed graphene oxide foam was collected into an alumina crucible and then placed at the center of a tube furnace. With the continuous feeding of ammonia (50 sccm) and argon (150 sccm) gas, the furnace was heated up to 500° C. (ramping rate=5° C./min) and held at 500° C. for 1 hour, followed by natural cooling under the continuous flow of Ar (150 sccm). Thereby, a dark brown $Co_1$-NG(O) catalyst was prepared.

Although the embodiments of the present invention have been disclosed for illustrative purposes, those skilled in the art will appreciate that the present invention may be embodied in other specific ways without changing the technical spirit or essential features thereof. Therefore, the embodiments disclosed in the present invention are not restrictive but are illustrative. The scope of the present invention is given by the claims, rather than the specification, and also contains all modifications within the meaning and range equivalent to the claims.

INDUSTRIAL APPLICABILITY

A catalyst for producing hydrogen peroxide according to the embodiments of the present invention may have good performance. For example, the catalyst for producing hydrogen peroxide may have high kinetic current density and mass activity with good stability for a long time. In addition, the catalyst for producing hydrogen peroxide can be prepared by a simple method and the manufacturing cost is low.

The invention claimed is:

1. A catalyst for producing hydrogen peroxide comprising:
    a carbon-based support comprising a C—O—C bonding structure; and
    a catalyst moiety that is bonded to the carbon-based support and comprises an M-N bonding structure ($M_1$ represents a transition metal atom),
    wherein the C—O—C bonding structure near the catalyst moiety changes the charge state of the $M_1$.

2. The catalyst for producing hydrogen peroxide of claim 1, wherein the catalyst moiety comprises an $M_1$-$N_4$ bonding structure.

3. The catalyst for producing hydrogen peroxide of claim 1, wherein the $M_1$ functions as a metal single atom catalyst.

4. The catalyst for producing hydrogen peroxide of claim 1, wherein the $M_1$ comprises cobalt (Co).

5. The catalyst for producing hydrogen peroxide of claim 1, wherein the electron rich species C—O—C bonding structure increases $\Delta G_{OOH*}$ for $H_2O_2$ production, and
    wherein $\Delta G_{OOH*}$ is OOH* adsorption energy expressing an oxygen reduction reaction activity.

6. The catalyst for producing hydrogen peroxide of claim 1, wherein the carbon-based support comprises graphene oxide.

7. The catalyst for producing hydrogen peroxide of claim 1,
    wherein the carbon-based support is doped with nitrogen by treating the carbon-based support with $NH_3$ at 400-600° C.

* * * * *